W. B. GRAY.
PIPE SUPPORT.
APPLICATION FILED SEPT. 16, 1912.
1,079,759.
Patented Nov. 25, 1913.
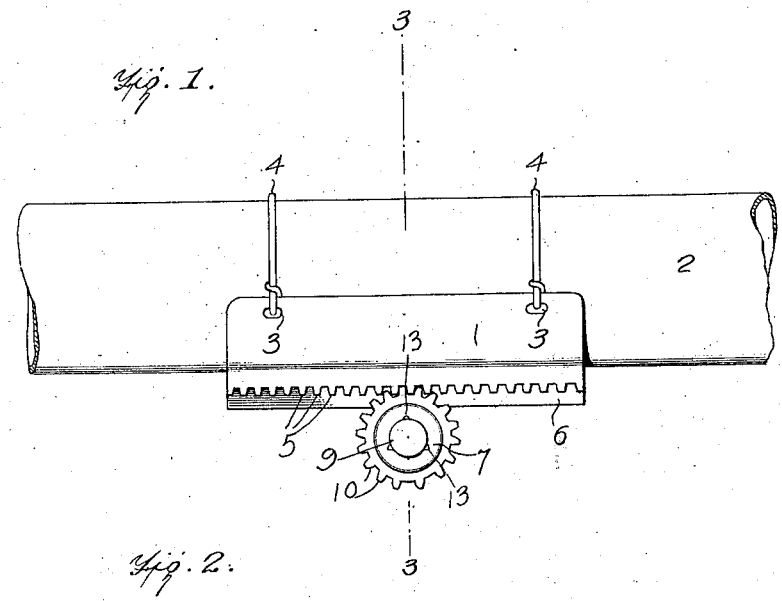
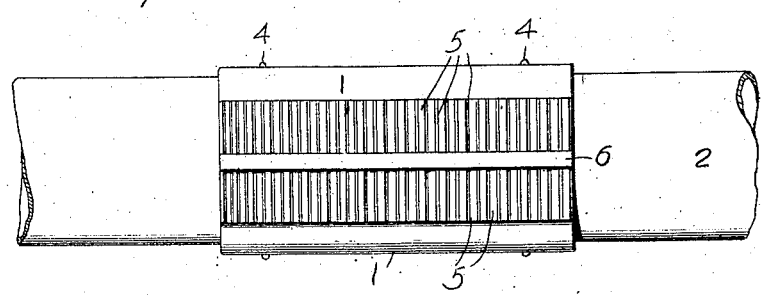
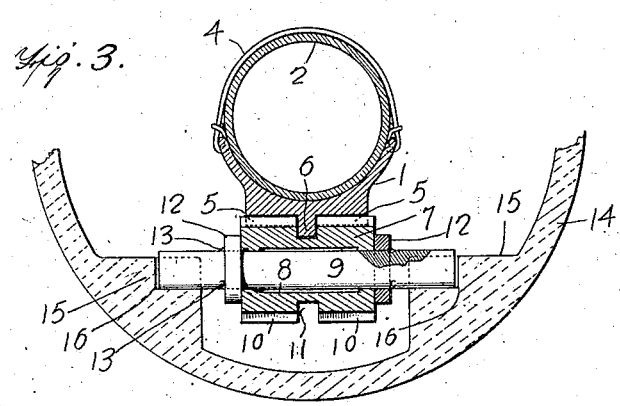
WITNESSES
L. H. Schmidt
R. W. Smith
INVENTOR
WILLIAM B. GRAY,
BY Munn & Co.
ATTORNEYS

UNITED STATES PATENT OFFICE.

WILLIAM BEALL GRAY, OF LOUISVILLE, KENTUCKY, ASSIGNOR TO MARTIN J. BANNON, OF LOUISVILLE, KENTUCKY.

PIPE-SUPPORT.

1,079,759.   Specification of Letters Patent.   Patented Nov. 25, 1913.

Application filed September 16, 1912. Serial No. 720,524.

*To all whom it may concern:*

Be it known that I, WILLIAM BEALL GRAY, a citizen of the United States, and a resident of Louisville, in the county of Jefferson and State of Kentucky, have invented certain new and useful Improvements in Pipe-Supports, of which the following is a specification.

My invention is an improvement in pipe supports, and has for its object the provision of a safe and simple device of the character specified, for supporting heating and power pipes, wherein means is provided for permitting the expansion and contraction of the pipes without injury to the said pipes or to the support.

Referring to the drawing forming a part thereof: Figure 1 is a side view of the improvement; Fig. 2 is a bottom plan view of the carriage or saddle; and, Fig. 3 is a section on the line 3—3 of Fig. 1.

The present embodiment of the invention comprises a movable support, carriage or saddle 1, for receiving the pipe 2, the said carriage or saddle being concave transversely to fit the pipe, as shown, and having at its side edges spaced openings 3 for the engagement of wires 4, the said wires passing over the pipe 2, and engaging the openings 3. The under face of the carriage or saddle is provided with a plurality of longitudinal series of transverse rack teeth 5, the said series being divided from each other by a longitudinal rib 6, which extends below the face of the teeth, as shown more particularly in Figs. 1 and 3.

A roller 7 is provided, the said roller having a central opening 8 for receiving a shaft 9, and having a plurality of annular series of gear teeth 10, separated and spaced from each other by an annular groove 11. The teeth 10 fit the teeth 5, and the rib 6 fits the groove 11. It will be noted also that the teeth of the series 10 are of greater length than the teeth of the series 5, so that the said teeth extend beyond the sides of the carriage, as shown in Fig. 3. The opening 8 for the shaft 9 is of greater diameter than the shaft, except at the ends of the roller, at which point the roller fits the shaft closely. A collar 12 is arranged on the shaft at each end of the roller, the said collar holding the roller from longitudinal movement on the shaft. Each collar is held in place against the ends of the roller by means of struck up spurs 13 or the like. The conduit 14 in which the pipe 2 and the support are arranged is provided on each side of the central line of its bottom with a rib 15, each of the said ribs having a horizontal upper face and a vertical inner face, and being integral with the conduit. The said ribs are provided at each shaft 9, with oppositely arranged notches 16, for receiving the ends of the shaft. The said notches are of a depth approximately equal to that of the shaft, and are of sufficient length to provide a clearance between the ends of the shaft, and the inner ends of the notches.

When the pipe 2 expands or contracts the saddle or carriage moves therewith, and the said movement of the carriage or saddle rotates the roller 7, and the shaft 9, the said shaft rotating in the notches 16. The pipe is thus while perfectly supported capable of longitudinal movement in either direction, without any possibility of injuring the conduit or the pipe.

It will be understood that the saddle is shaped on its upper face to fit the pipe 2, or the insulation of the said pipe when the pipe carries insulation. The saddle may be also provided with my improved anchoring means shown in my prior application, Serial No. 709,262, filed July 13, 1912, when carrying insulated pipe.

It will be evident that the shaft might be integral with the roller, or might be secured thereto in any other suitable manner. The projecting ends of the shaft are in fact journal pins for the roller, for engaging the supports in the conduit. The shaft 9 does not necessarily rotate, as the roller may be arranged to rotate on the shaft.

I claim:—

1. In combination with the conduit, a device of the character specified, comprising a carriage for the pipe, the upper face of the carriage being concave transversely to fit the pipe to be supported, said carriage having on its under face a longitudinal central rib, and a series of gear teeth on each side of the rib, a roller provided with an annular groove for receiving the rib, and with an annular series of gear teeth on each side of the rib, to fit the teeth of the carriage, said roller having a central longitudinal bore, the ends of the bore being restricted, a shaft received in the bore and fitting the restricted ends, a collar on the shaft at each end of the roller, said shaft having struck up lugs for holding the collars from outward movement, the conduit having a longitudinally extending rib on each side of the central line of its bottom, each rib having a horizontal upper face and a vertical inner face, said ribs having oppositely arranged notches for receiving the ends of the shaft.

2. A device of the character specified, comprising a carriage for the pipe, the upper face of the carriage being concave transversely to fit the pipe to be supported, said carriage having on its under face a longitudinal central rib, and a series of gear teeth on each side of the rib, a roller provided with an annular groove for receiving the rib, and with an annular series of gear teeth on each side of the rib, to fit the teeth of the carriage, said roller having a central longitudinal bore, the ends of the bore being restricted, a shaft received in the bore and fitting the restricted ends, a collar on the shaft at each end of the roller, said shaft having struck up lugs for holding the collars from outward movement, the ends of the shaft extending beyond the collars.

3. A device of the character specified, comprising a carriage for the pipe, the upper face of the carriage being concave transversely to fit the pipe to be supported, said carriage having on its under face a longitudinal central rib, and a series of gear teeth on each side of the rib, a roller provided with an annular groove for receiving the rib, and with an annular series of gear teeth on each side of the rib, to fit the teeth of the carriage, and a shaft for the roller, said shaft extending at its ends beyond the ends of the roller and having means for preventing longitudinal movement of the roller.

4. A device of the character specified, comprising a carriage for the pipe, the upper face of the carriage being concave transversely to fit the pipe to be supported, said carriage having on its under face a longitudinal central rib, and a series of gear teeth on each side of the rib, a roller provided with an annular groove for receiving the rib, and with an annular series of gear teeth on each side of the rib, to fit the teeth of the carriage, said roller having an axial journal pin at each end for the purpose specified.

5. A device of the character specified, comprising a carriage for the pipe having on its under face a longitudinal central rib and a longitudinal series of gear teeth on each side of the rib, the rib depending below the teeth, and a roller having an annular series of gear teeth for each series of the carriage, and an annular groove between the series for receiving the rib, and having an axial journal pin for the purpose specified.

6. A device of the character specified, comprising a carriage for the pipe, said carriage having laterally spaced longitudinal series of gear teeth, a roller having an annular series of gear teeth for each series of the carriage, and having an axial journal pin at each end, and means for preventing lateral movement of the carriage with respect to the roller.

7. A device of the character specified, comprising a carriage, having a longitudinal series of gear teeth, a roller having an annular series of teeth fitting the teeth of the carriage, and having an axial journal pin at each end, and means in connection with the carriage and the roller for preventing lateral movement of the carriage.

WILLIAM BEALL GRAY.

Witnesses:
JOSEPH A. McKEE,
CHAS. F. TAYLOR.

---

Copies of this patent may be obtained for five cents each, by addressing the "Commissioner of Patents, Washington, D. C."